April 1, 1930.  A. J. ZWILLING ET AL  1,753,080
OPTICIAN'S PLIERS
Filed March 26, 1927
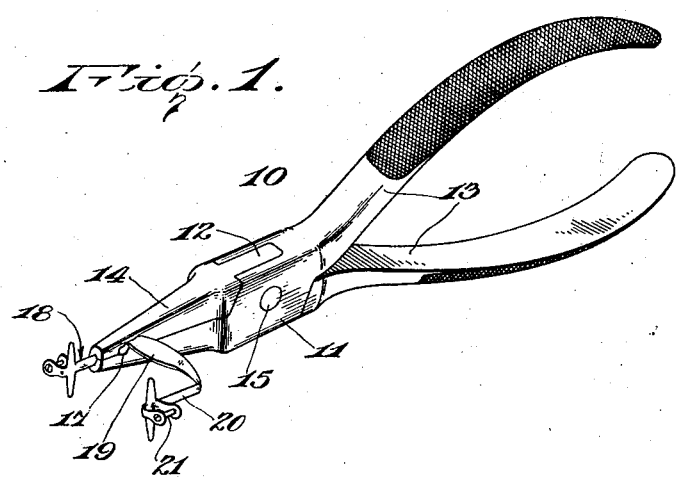
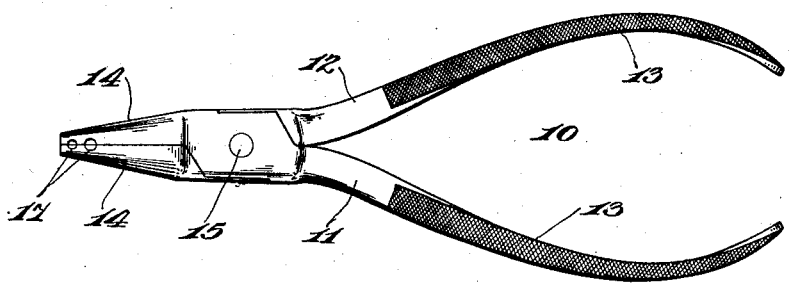
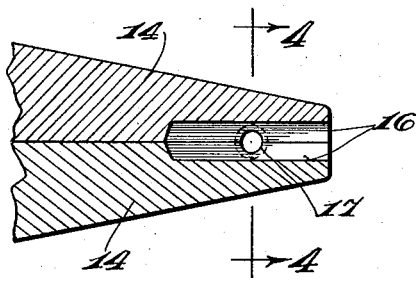 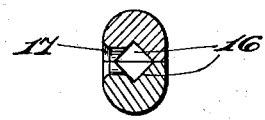
Arthur J. Zwilling
Jacob Faist
INVENTOR
BY *Victor J. Evans*
ATTORNEY
WITNESS:

Patented Apr. 1, 1930

1,753,080

UNITED STATES PATENT OFFICE

ARTHUR J. ZWILLING, OF VALLEY STREAM, AND JACOB FAIST, OF GLENDALE, NEW YORK

OPTICIAN'S PLIERS

Application filed March 26, 1927. Serial No. 178,686.

This invention relates to improvements in pliers and has particular reference to an optician's pliers.

The primary object of the invention resides in an instrument for firmly gripping and holding the nose piece of an eye glass mounting to facilitate the bending of the shank of the mounting by the use of another instrument in order to obtain the desired angle at which to position the lens of the eye glass to suit the nose and the vision of the eyes of the intended wearer.

Another object of the invention is to provide an optician's pliers for positively gripping the shank of the nose piece or mounting with multiple contact and which will not mar the shank during such gripping, it being appreciated that the nose piece is constructed of a pliable material and is of a very delicate nature.

Another object is to provide an optician's pliers which includes a pair of co-acting jaws, each of which is provided with a longitudinal groove to receive the shank of an eye glass mounting while the jaws are further provided with co-acting notches in the sides thereof and which communicate with said grooves to receive a portion of the bridge at its joinder with the shank to firmly grip and hold the shank during the bending of the lens support to the desired angle.

With these and other objects in view, the invention resides in certain novel construction and combination and arrangement of parts, the essential features of which are hereinafter fully described, are particularly pointed out in the appended claim, and are illustrated in the accompanying drawing, in which:—

Figure 1 is a perspective view of our improved pliers, showing the manner of gripping and holding the shank of an eye glass mounting.

Figure 2 is a side elevation of the pliers.

Figure 3 is an enlarged vertical longitudinal section view through the jaws.

Figure 4 is a vertical transverse sectional view on the line 4—4 of Figure 3.

Referring more particularly to the drawing, the reference numeral 10 designates our improved pliers in its entirety and which comprises a pair of sections 11 and 12, each section having a handle portion 13 at one end and a pointed jaw 14 at its opposite end. The jaws are tapered toward their free ends and while the cooperating or inner faces thereof are flat, their outer faces are rounded. The sections are pivotally connected intermediate their ends as at 15 to cause the jaws to open upon the separation of the handle portions 13 and to close upon the moving of the handle portions toward each other. The inner faces of the jaws 14 are provided with longitudinal V-shaped grooves 16 which receive the part to be gripped. The sides of the jaws are provided with semi-circular shaped notches or grooves 17 which are disposed at right angle to the length of the grooves 16 and which communicate with said grooves 16 to produce a plurality of continuous right-angular grooves. One portion of each right-angular groove (16—16) includes upper and lower V-shaped surfaces while the other portion (17—17) includes upper and lower cooperative rounded surfaces for a purpose to be presently explained. The notches 17 are disposed in suitable spaced relation on opposite sides of the jaws for accommodating shanks of different lengths, those on one side being staggered with relation to those on the opposite side so that the meeting portions of the jaw members 14—14 opposite each of the notches 17 present a closed outer wall.

In Figure 1 of the drawing, we have shown our invention in use, wherein the eye glass mounting 18 is being held. The mounting is of the usual well-known construction and includes an arched or curved bridge piece 19, adapted to fit over the nose of a wearer, and from which shanks 20 extend. The shanks 20 are substantially rectangular in cross-section and support lens mountings 21 on their outer free ends. For gripping the eye glass mounting during the bending operation of the shanks 20 to the desired angle to dispose the lenses to meet the condition of the eyes of a wearer, the shank 20 is inserted between the jaws 14 and the said shank seats firmly in the V-shaped grooves 16 with four-point contact. The base of the bridge 19 or that portion at the joinder with the shank, extends through one set of notches 17, the particular set of notches depending upon the length of the shank. The length of the shanks on the eye glass mountings are standardized so that only three sets of notches are necessary. When properly seated, the portion of the shank being gripped, extends beyond the end of the jaws to allow another instrument to be applied thereto to bend the lens mounting 21 to the desired angle. The jaws 14 firmly grip the shank so that the eye glass mounting will not turn with respect to the pliers during the bending operation. The construction of the plier jaws with a continuous enclosed right-angular groove having different engaging surfaces in the two portions of the continuous groove, so arranged that different transverse groove portions 17 may be used in combination with the longitudinal groove portion 16, enables the tool to be adjustable in its use to exert a firm grip on bridge or nose-piece shanks of different length.

Although we have specifically stated that the instrument is especially adapted for the above purpose, it will be appreciated that the same can be used for other purposes should it be desired.

While we have described what we deem to be the most desirable embodiment of our invention, it is obvious that many of the details may be varied without in any way departing from the spirit of our invention, and we therefore do not limit ourselves to the exact details of construction herein set forth nor to anything less than the whole of our invention limited only by the appended claim.

What is claimed as new is:

In combination, an optician's pliers comprising a pair of pivoted jaw members including handle portions and coacting jaws, said jaws having coacting longitudinal grooves, V-shaped in cross section, formed in the respective cooperating jaw faces, and having a plurality of pairs of coacting grooves extending transversely from said longitudinal grooves to opposite sides of said jaw members, the meeting side portions of the jaw members opposite each pair of transverse grooves presenting a closed wall at the juncture of the latter with said longitudinal grooves, whereby the plier jaw members include a plurality of right angular grooves for selective use with eye-glass bridge-pieces of different length, each of said right angular grooves including a longitudinal portion adapted to receive the shank of an eye-glass bridge-piece with four point contact and another portion of said bridge-piece with rounded engaging surfaces, to firmly grip said bridge-piece on closing said jaws.

In testimony whereof we hereby affix our signatures.

ARTHUR J. ZWILLING.
JACOB FAIST.